United States Patent
Bhat et al.

[11] Patent Number: 5,308,509
[45] Date of Patent: May 3, 1994

[54] FGD PERFORMANCE ENHANCEMENT BY HYDROCLONE AND RECYCLING STEPS

[75] Inventors: Pervaje A. Bhat, North Canton; Dennis W. Johnson, Barberton, both of Ohio

[73] Assignee: The Babcock & Wilcox Company, New Orleans, La.

[21] Appl. No.: 28,895

[22] Filed: Mar. 8, 1993

[51] Int. Cl.⁵ .................. B01D 17/038; B01D 50/00
[52] U.S. Cl. .................. 210/770; 55/228; 95/195; 210/195.1; 210/259; 210/787; 210/805; 210/806; 422/168; 422/234; 423/243.11
[58] Field of Search .................. 210/188, 195.2, 259, 210/260, 512.1, 513, 758, 770, 787, 803, 804, 805, 806; 95/189, 195, 196, 197; 96/181; 423/170, 171, 172, 242.2, 243.01, 243.1, 243.11, 243.08; 422/168, 169, 170, 234; 55/228

[56] References Cited
U.S. PATENT DOCUMENTS

| | | |
|---|---|---|
| 4,046,856 | 9/1977 | Itoo et al. .................. 423/243.1 |
| 4,431,608 | 2/1984 | Katagiri et al. .................. 55/228 |
| 4,515,754 | 5/1985 | Stehning .................. 55/228 |
| 4,853,195 | 8/1989 | Lehto .................. 422/168 |
| 4,976,936 | 12/1990 | Rathi et al. .................. 423/243.11 |
| 4,986,966 | 1/1991 | Lehto .................. 422/169 |
| 4,996,032 | 2/1991 | Stowe et al. .................. 423/243.11 |

*Primary Examiner*—Joseph W. Drodge
*Attorney, Agent, or Firm*—Robert J. Edwards; Michael L. Hoelter

[57] ABSTRACT

A flue gas desulfurization process wherein the liquid bottoms product from the scrubber tower is subject to forced oxidation in a reaction/oxidation tank. Afterwards, this oxidized bottoms product is delivered to hydroclone means for separation into an overflow stream containing an aqueous slurry of mostly fines, fly ash, and unused reagent and an underflow stream containing predominately a gypsum slurry. The overflow stream is initially recycled back to the tank with another stream being subsequently returned or recycled back to the scrubber tower while the underflow stream is dewatered for the removal of the gypsum therein.

16 Claims, 1 Drawing Sheet

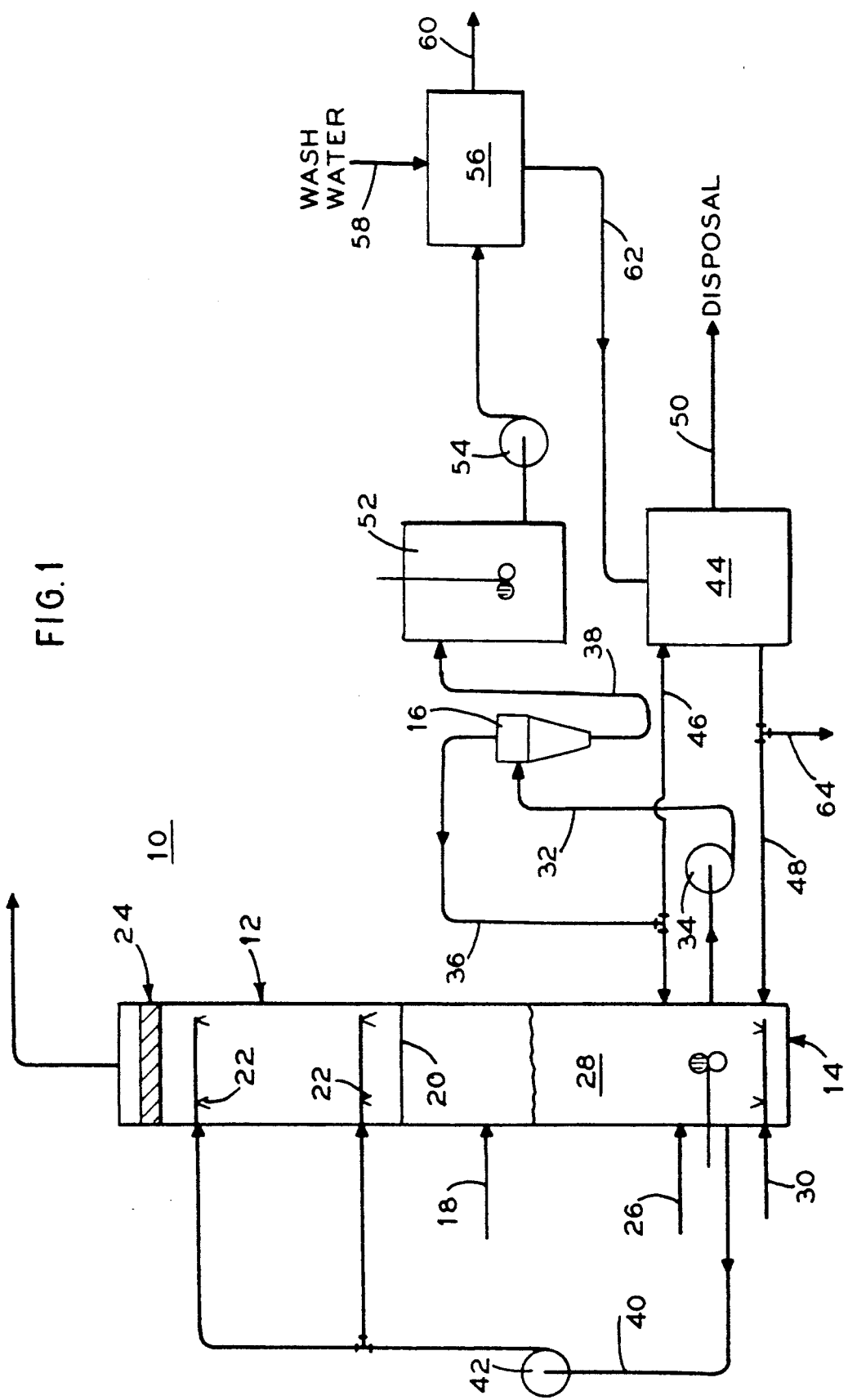

FGD PERFORMANCE ENHANCEMENT BY HYDROCLONE AND RECYCLING STEPS

FIELD OF THE INVENTION

This invention pertains to flue gas desulfurization (FGD), and more particularly to the use of a hydroclone to receive and separate an oxidized bottoms product from the scrubber tower so that fly ash, fines, unreacted reagent, and organic acid additives, but not sulfate (gypsum), can be effectively returned to the tower.

BACKGROUND OF THE INVENTION

In flue gas desulfurization (FGD) processes, hydroclones are often used to treat the end sludge by-product of the process. They de-water or concentrate this scrubber sludge just before it is sent to a landfill or otherwise disposed of. Such use reduces the volume of this sludge by-product because any water therein is removed or at least diminished, thereby reducing the cost of its disposal.

Generally, during operation, a hydroclone will separate the incoming product into two separate streams. One will be mostly liquid with little sludge therein while the other will contain mostly sludge with little liquid therein. It has not heretofor been fully realized that this feature of separating an incoming product into two separate streams, along with others, may be quite useful in improving the performance of the upstream flue gas desulfurization process.

In a typical FGD process, incoming combustion flue gas from a boiler, furnace or the like is sprayed with a chemical reagent in a scrubber or absorber tower. This reagent reacts with the sulfur dioxide (or other targeted contaminant) in the flue gas thereby cleansing the flue gas before it is released to the atmosphere. The spent reagent and removed sulfur dioxide collect in the bottom of the scrubber tower where it is subsequently removed and discarded or otherwise disposed of. It is just prior to disposal that hydroclones are oftentimes utilized in order to reduce the volume of this bottoms product sludge.

To increase reagent utilization, FGD processes oftentimes recycle a portion of the bottoms product back to the spray heads directly from the bottom of the scrubber tower so that any un-utilized or under-utilized reagent will be fully consumed before it leaves the tower and is discarded. While this has led to increased performance, the delivery of such bottoms product to the spray header poses an additional problem of maintaining the property of this bottoms product within a certain range. In some cases, the location of the suction exit from the bottom of the tower becomes critical since the bottoms product to be delivered to the spray nozzles must not contain too much sludge nor can it contain too little reagent.

It is thus an object of this invention to provide an FGD process whereby the composition of the returned bottoms product is improved and is known with greater certainty. Another object of this invention is to utilize a hydroclone to further control or maintain the desired consistency of the recycled product. Yet another object of this invention is to increase the use of the recycled bottoms product such that less additives or fresh reagent need be supplied or injected into the FGD process. Still another object of this invention is to enhance or promote the purification of the bottoms product sludge that is sent for disposal. Another object of this invention is to increase the average gypsum crystal size sent for disposal, with less contamination therein, so that subsequent uses can be accomplished. Still another object of this invention is to promote the re-use of crystal fines in the bottoms product for greater removal of sulfur from the flue gas. These and other objects and advantages of this invention will become obvious upon further investigation.

SUMMARY OF THE INVENTION

What is disclosed is a method and apparatus to improve flue gas desulfurization which incorporates a scrubber tower containing a liquid bottoms product therein. An oxidation tank integral with the scrubber tower and containing oxidation means receives this liquid bottoms product from the scrubber tower and forces its oxidation. Afterwards, this oxidized liquid bottoms product is transported to a hydroclone which separates this oxidized liquid bottoms product into an overflow stream and an underflow stream. The overflow stream consists primarily of fly ash, fines, unused reagent and organic acid additives while the underflow stream consists primarily of a gypsum slurry. The underflow stream is directed to a dewatering assembly in order to de-water and concentrate this gypsum slurry for the recovery of gypsum while the overflow stream is recycled back to the scrubber tower.

BRIEF DESCRIPTION OF THE DRAWING

FIG. 1 is a schematic flow diagram of the new FGD process disclosed herein showing the utilization of a hydroclone to purify the oxidized bottoms product from a scrubber tower before it is recycled back to the tower.

DETAILED DESCRIPTION OF THE DRAWING

Referring to FIG. 1, there is shown FGD process 10 incorporating a scrubber tower 12, a reactor/oxidation tank 14, a hydroclone 16 and subsequent storage and clarifying devices used to further clean and/or concentrate the bottoms product generated within tower 12. All control devices, valves, monitors, and the like, and most pumps, have been removed from FIG. 1 for clarity.

Flue gas 18 enters scrubber tower 12 at a lower elevation thereof and flows upward through one or more perforated trays 20 therein for a tray tower and against the spray from spray nozzles 22. For a spray tower, flue gas 18 flows upward against the spray from spray nozzles 22. This flue gas 18 then passes through a series of mist eliminators 24 before it is released to the atmosphere as cleaned flue gas.

In scrubber tower 12, any sulfur dioxide ($SO_2$) in flue gas 18 is absorbed by one or more chemical reagents sprayed onto the flue gas 18 from spray nozzles 22. Some of the more typical chemical reagents used include calcium based alkali compounds such as lime ($CaO$) or limestone ($CaCO_3$). Generally, such reagents, and in particular limestone, are finely ground so that at least 90% to 95% of the reagent will pass through a 325 mesh screen before being supplied to process 10, such as via reagent supply line 26 discharging a fresh reagent slurry into tank 14.

After being sprayed and collected in the bottom of tower 12, this used reagent and the removed sulfur, which forms a slurry otherwise known as liquid bottoms product 28, is delivered to reactor/oxidation tank 14. While in tank 14, this bottoms product 28 undergoes forced chemical oxidation such as by injecting air 30 into tank 14. After such forced oxidation, the resultant slurry contained within tank 14 contains suspended solids which consist mainly of calcium sulfate (Ca-$SO_4.2H_2O$ or gypsum) along with unreacted carbonate, fines, and scrubber fly ash from tower 12. This resultant oxidized slurry is then delivered to hydroclone 16 via line 32 and pump 34. Hydroclone 16 may incorporate a single unit or multiple small hydroclones in series or parallel to provide the desired separation.

Generally, hydroclone 16 is operated at a pressure of from 10 to 25 psi (more or less) with its feedstock (line 32) containing from 5% to 25% (more or less) solids concentration. As this feedstock is circulated within hydroclone 16, it is separated into an overflow stream 36 and an underflow stream 38.

Preferably, overflow stream 36 from hydroclone 16 will contain 0.5% to 4% (more or less) suspended solids therein while underflow stream 38 will have from 20% to 65% (more or less) suspended solids therein. Furthermore, as a result of passing through hydroclone 16, the heavier and larger gypsum particles will be removed from the feedstock and will collect in underflow stream 38. This underflow stream 38 will contain a very small quantity of fines and/or fly ash therein, instead, most of these fines and/or fly ash particles will be separated from the larger gypsum particles in hydroclone 16 and will collect in overflow stream 36. Additionally, any unreacted calcium carbonate particles, which are finer in size as compared to gypsum particles, will also effectively be separated in hydroclone 16 and will collect in overflow stream 36. However, it should be noted that some fines collected in overflow stream 36 will also be small gypsum nuclei particles. These gypsum particles will be used to provide surface area for subsequent gypsum growth thereby further enhancing gypsum and/or sulfur removal.

As shown in the drawing, overflow stream 36 is returned to tank 14. This stream 36 aids in diluting the liquid bottoms product 28 in tank 14 thereby helping maintain a certain concentration level of the slurry contents within tank 14. Slurry contents of tank 14 are then removed from tank 14 via line 40 and pump 42 and recycled back to tower 12. This solution/slurry is used within tower 12 to spray the incoming flue gas 18 in order to remove sulfur or other targeted contaminants as stated above. Because such solution/slurry will generally also contain small gypsum nuclei particles, gypsum crystal growth within absorber 12 and/or integral tank 14 will occur thereby enabling such crystals to eventually be separated from the other fines in hydroclone 16 and collect in underflow stream 38.

Should it be preferable or desirable for overflow stream 36 to be further concentrated or separated, all or a part of stream 36 can be delivered to clarifier or fines filter 44. This filter 44 will further separate, in the typical fashion, the incoming flow stream 46 into a liquid stream 48 and a solids stream 50. Liquid stream 48 is delivered back to tank 14 (directly, or mixed with reagent through reagent supply line 26) or to purge 64 which is used to control undesirable dissolved solid species and fines while concentrated solids stream 50 is delivered elsewhere for subsequent use or disposal.

Referring now to underflow stream 38 from hydroclone 16, this stream 38 is initially directed as shown to slurry storage tank 52 for temporary storage. Afterwards, stream 38 is transported, such as by pump 54, to typical vacuum filter and/or centrifuge 56 (and in some cases to a settling pond or gypsum stack) for dewatering. Vacuum filter 56 may consist of a belt filter, a drum filter or the like with wash water 58 being added as needed in order to aid in the removal of the gypsum solids contained within stream 38 from any fines, other small particles therein, or undesirable dissolved solid species. These gypsum solids are consolidated and discharged for further use such as by line 60 while the removed fines and resultant slurry are delivered via line 62 to clarifier 44 for further processing. Because underflow stream 38 from hydroclone 16 contains a large proportion of solids, it can be dewatered as described above using such equipment as a belt filter or the like. Consequently, smaller and simpler machinery for dewatering may be used rather than requiring large thickeners or the like.

In some cases, it may become desirable to use adipic, dibasic, formic acid or other additives to increase operating performance. In these and in other cases, organic additives, crystal habit modifiers, Chelate, etc. may also be supplied FGD process 10, such as via reagent supply line 26, so as to improve operations. If such substances are used and subsequently recirculated back to tower 12 via overflow stream 36 then the effectiveness of these organic agents or additives will be significantly increased. By incorporating hydroclone 16 in process 10, a smaller quantity of additives is required since such additives are now used more effectively due to their being separated from the larger gypsum particles and recycled back to scrubber tower 12. Process 10 also permits a smaller inventory of such additives and has less degradation potential, hence less organic additives are consumed or needed in FGD process 10.

Some of the advantages of incorporating hydroclone 16 in a limestone forced oxidation process as described above include: (a) a significant improvement in the quality of the gypsum recovered; (b) effective carbonate separation in hydroclone 16 from underflow stream 38 which is then returned back to tower 12; and, (c) effective organic acid or additive separation and usage.

These and other improvements pertain to the utilization of the gypsum crystal fines, which are newly formed, as a nuclei site for gypsum crystal growth. Additionally, up to 20% or more carbonate is recovered using hydroclone 16, with this carbonate being returned back to tower 12 for further use in capturing sulfur from flue gas 18.

Furthermore, vacuum filter or centrifuge 56 performance will increase since the average gypsum crystal size, in accordance with this process 10, is large and contains less carbonate and contaminants therein. Consequently, the recovered gypsum is better suited for subsequent use, such as in the manufacture of wallboard, rather than being sent for disposal to a landfill. These improvements using process 10 also pertain to the generation of a cleaner and more purified gypsum end product which is accomplished by separating the fly ash, which is finer than gypsum, in hydroclone 16 and subsequently recirculating this fly ash back to tower 12, or an alternate clarifier/filter, while the cleaned gypsum is sent for further processing. Generally, a higher concentration (about 40%) of gypsum slurry from underflow stream 38 can be processed rather than the normal 25-35% available from normal FGD processes. This substantially reduces the cost of filtration since less filtering is now required. Additionally, the washing of the filter cake for chloride content of the gypsum will also be reduced.

Another advantage of process 10 is the fact that the coarse gypsum in underflow stream 38 is sent to either a belt filter, drum filter, centrifuge, or the like, without being subject to mechanical degradation by abrasion in a large pump (unlike thickener underflow pumps) or from agitation. Thus, the quality of the gypsum is improved with less fines therein from such mechanical grinding. In accordance with this forced oxidation process 10, a design reagent stoich of 1.05 or less is much improved when compared to earlier designs of 1.10 or more for natural oxidation systems.

Tests have demonstrated that using hydroclone 16 in a loop test and In Stand Alone tests have demonstrated the above improvements when overflow stream 36 is returned back to tower 12 for recovering fines, carbonates and organic additives (such as dibasic acid). Pilot scale tests also indicate that additive consumption is remarkably low in process 10, using below 2 pounds per ton $SO_2$ as compared with the normal range of between 8 to 15 pounds of additives per ton of $SO_2$ for processes without hydroclone 16.

Furthermore, because of the improved usage of the reagents and the additives, blowdown quality is increased. Additionally, these same benefits will occur for inhibited oxidation systems or systems using crystal modifiers to produce large crystals. Examples of such oxidation inhibitors include formate ion, sulfur, thiosulfate, and some metallic ions.

This process 10 can also separate suspended solids from dissolved solids in a magnesium-lime system. In this case, the soluble $MgSO_3$ alkali is enriched and returned to tower 12 while suspended solids (gypsum and/or dehydrated gypsum) are sent for further dewatering.

What is claimed is:

1. An apparatus for flue gas desulfurization incorporating a scrubber tower containing a liquid bottoms product therein, wherein the improvement comprises:
    (a) a reaction/oxidation tank into which the liquid bottoms product flows;
    (b) forced oxidation means in said reaction/oxidation tank for oxidizing the liquid bottoms product;
    (c) hydroclone means for receiving the oxidized liquid bottoms product from said reaction/oxidation tank, said hydroclone means separating said oxidized liquid bottoms product into an overflow stream and an underflow stream, said overflow stream primarily comprising fly ash, fines, unused reagent, and organic additives while said underflow stream primarily comprising a concentrated gypsum slurry;
    (d) dewatering means constructed to receive said underflow stream for dewatering and concentrating said gypsum slurry;
    (e) recycle means for recycling contents of said reaction/oxidation tank back to the scrubber tower; and,
    (f) return means for initially delivering all or a portion of said overflow stream to said reaction/oxidation tank prior to being recycled back to the scrubber tower.

2. The apparatus as set forth in claim 1 wherein said dewatering means comprise one or more of a vacuum filter, a centrifuge, a settling pond, and a gypsum stack for dewatering said underflow stream.

3. The apparatus as set forth in claim 2 further comprising a clarifier and/or a fines filter to which all or a portion of said overflow stream is directed prior to being recycled back to the scrubber tower.

4. The apparatus as set forth in claim 3, wherein a stream from said dewatering means is transported to said clarifier and/or fines filter.

5. The apparatus as set forth in claim 4 wherein said clarifier and/or fines filter produces a filtrate which is delivered to said reaction/oxidation tank.

6. The apparatus as set forth in claim 5 wherein said hydroclone has an operating pressure of approximately 10-25 psi with 5% to 25% suspended solids feed.

7. The apparatus as set forth in claim 6 wherein said hydroclone comprises separation means for separating the oxidized liquid bottoms product into an overflow stream containing approximately 0.5% to 4% suspended solids and into an underflow stream containing approximately 20% to 65% suspended solids.

8. A method of flue gas desulfurization incorporating a scrubber tower containing a liquid bottoms product therein wherein the improvement comprises the steps of:
    (a) oxidizing the liquid bottoms product generated in the scrubber tower in a reaction/oxidation tank;
    (b) delivering the oxidized liquid bottoms product to a hydroclone assembly;
    (c) separating the oxidized liquid bottoms product in said hydroclone into an overflow stream and an underflow steam, said overflow stream primarily comprising an aqueous slurry of fly ash, fines, organic acids and unused reagent while said underflow stream primarily comprising a gypsum slurry;
    (d) transporting said underflow stream to a dewatering process where gypsum is recovered;
    (e) recycling or returning contents of said reaction/oxidation tank back to said scrubber tower for subsequent spraying onto incoming flue gas; and,
    (f) initially returning all or a portion of said overflow stream comprising at least recovered reagent and organic acids to said reaction/oxidation tank prior to recycling said stream to the tower.

9. The method as set forth in claim 8 further comprising the step of transporting said underflow stream to one or more of a vacuum filter, a centrifuge, a settling pond, and a gypsum stack for dewatering.

10. The method as set forth in claim 9 further comprising the step of delivering all or a portion of said overflow stream to a clarifier and/or a fines filter.

11. The method as set forth in claim 10 further comprising the step of transporting a stream from said dewatering means to said clarifier and/or fines filter.

12. The method as set forth in claim 11 further comprising the step of delivering a stream from said clarifier and/or fines filter to said reaction/oxidation tank.

13. The method as set forth in claim 12 further comprising the step of operating said hydroclone at a pressure of approximately 10-25 psi with 5% to 25% suspended solids feed.

14. The method as set forth in claim 13 further comprising the step of separating the oxidized liquid bottoms product in said hydroclone into an overflow stream containing approximately 0.5% to 4% suspended solids and into an underflow stream containing approximately 20% to 65% suspended solids.

15. The method as set forth in claim 12 further comprising the step of purging a portion of said stream from said clarifier and/or fines filter to remove undesirable dissolved solids species.

16. The method as set forth in claim 8 further comprising the step of enhancing crystallization in the liquid bottoms product of the scrubber tower by recycling fines to the tower in said overflow stream.

* * * * *